United States Patent [19]

Linard

[11] 4,002,919
[45] Jan. 11, 1977

[54] SCANNING APPARATUS FOR MEASURING THE DIMENSION OF AN OBJECT

[76] Inventor: Robert Linard, 22 Bis rue de Serre, 54000 Nancy, France

[22] Filed: July 9, 1975

[21] Appl. No.: 594,234

[30] Foreign Application Priority Data

Nov. 4, 1974 France .............................. 74.40629

[52] U.S. Cl. .............................. 250/560; 250/227; 250/233
[51] Int. Cl.² ......................................... G01N 21/30
[58] Field of Search ............... 250/211 K, 227, 560, 250/561, 233; 178/7.6

[56] References Cited

UNITED STATES PATENTS

| | | | |
|---|---|---|---|
| 1,945,968 | 2/1934 | De Amicis | 178/7.6 |
| 3,358,150 | 12/1967 | Summer | 250/211 K |
| 3,619,626 | 3/1969 | Rudolf | 250/561 |
| 3,727,067 | 4/1973 | Shepherd | 250/560 |
| 3,806,730 | 4/1974 | Tirkkonen et al. | 250/227 |

Primary Examiner—David C. Nelms
Attorney, Agent, or Firm—Robert E. Burns; Emmanuel J. Lobato; Bruce L. Adams

[57] ABSTRACT

Apparatus for measuring the length of rolled steel shapes and the like comprises means for directing light onto the steel shape to produce a shadow up to an end of its length. A light receiver is provided for measuring this length. It comprises a cylindrical stationary element and a cylindrical rotatable element, one inside the other and both having apertures for forming a resulting aperture which has at least a movable portion. The apparatus also comprises a photo-electric transducer provided for example by a light-guiding rod inside the elements of the light receiver, for exposure of the rod to the shadow, through the resulting aperture. Photosensitive elements are provided at the ends of the rod.

10 Claims, 12 Drawing Figures

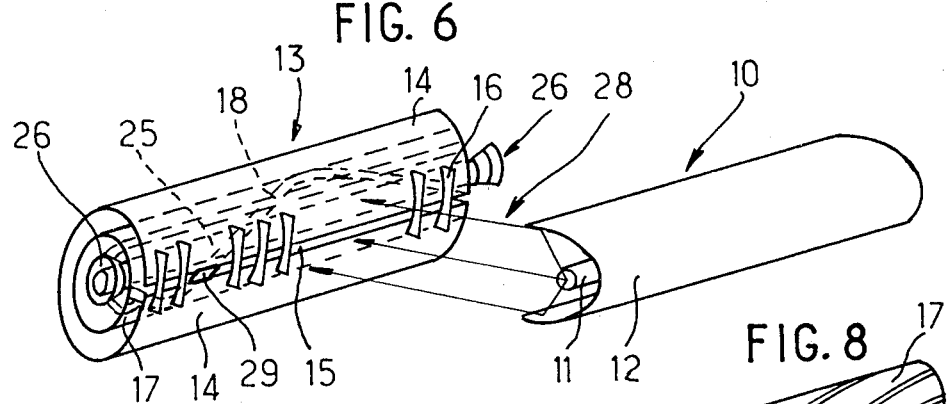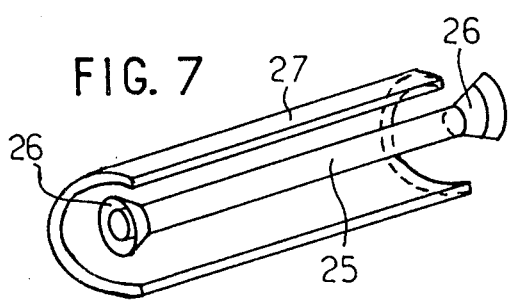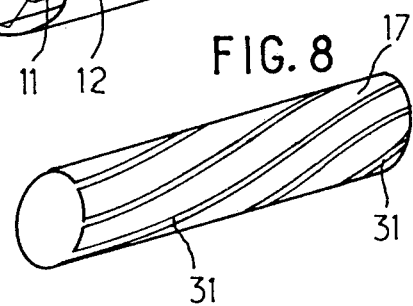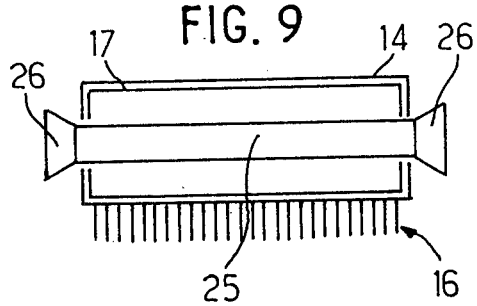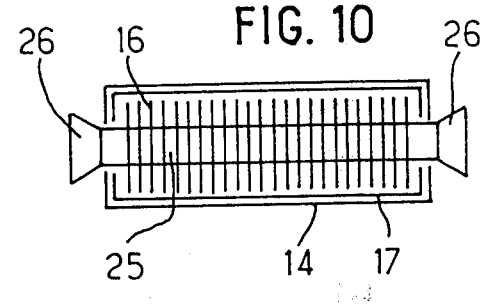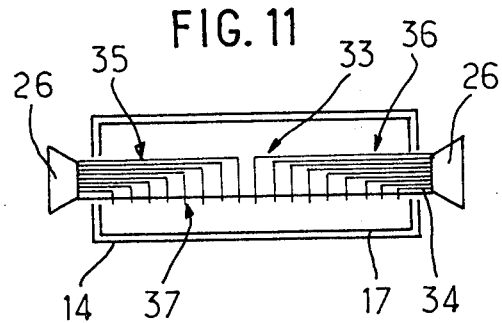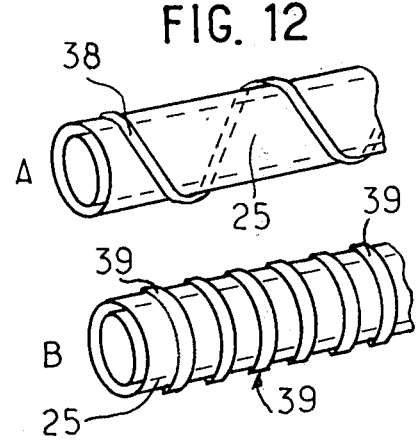

SCANNING APPARATUS FOR MEASURING THE DIMENSION OF AN OBJECT

BACKGROUND OF THE INVENTION

This invention relates to a measuring apparatus or device, particularly to a detecting device, for measuring lengths, usually the length of long siderurgical or metallurgical products.

This length is particularly sought for to condition rolled products in siderurgy of metallurgical products from iron and steel works. If the length of a rolled product together with its cross-section and density is known, it is possible to deduct its weight.

On the other hand, when this length is to be cut into submultiple lengths, the measurement of this length allows the optimum submultiple length resulting in a minimum loss to be determined.

It is desirable to measure siderurgical products, particularly long products, while the same are being conveyed on a roller conveyor, this being also an object of this invention.

Apparatuses for carrying out these measurements already exist. Generally, they are of complicated structure and give measures of poor accuracy.

In this respect mention is made of:-

Fixed cell apparatuses which require the product to be displaced at uniform speed;

optical circular sweeping apparatus which bring about an error in the trigonometrical angle measurement, this error increasing with lateral displacement of the product while the latter is conveyed on the roller conveyor;

optical fibre apparatus having photo-sensitive elements at regular interval. This type of apparatus is expensive owing to the number of detection components and its data processing system. Moreover, the length error is of the order of an interval.

The purely mechanical solutions (or realization) area of limited speed.

An object of the invention is to provide an improved device without the drawbacks of the existing apparatuses.

SUMMARY OF THE INVENTION

This invention relates to a measuring apparatus, particularly to its detecting device, particularly for measuring the length of rolled products.

This measuring apparatus is characterized in that its detecting device comprises a light emitting device and a light receiving device, either device, preferably the receiving device, having means capable of forming a linearly moving luminous spot from a rotated constituent member, in that the receiving device of cylindrical form has an envelope formed with a window in the form of a slit extending parallel to the axis thereof and an inner straight element facing this slit and transmitting the received luminous flux photosensitve elements.

This detecting device provides several advantages.

First of all, the total cost of the apparatus is largely lower than that of all existing realizations for making the same measurements.

The quality and accuracy of the measurements are exceptional. Moreover, the accuracy remains uniform up to speeds which are considered as high for conveying rolled products.

This apparatus is simple to manufacture and is of good reliability.

BRIEF DESCRIPTION OF DRAWINGS

The invention will now be described by way of example with reference to the accompanying drawings wherein:-

FIG. 6 is a perspective view of an emitter-receiver assembly according to a third embodiment directly deriving from the modification illustrated in FIG. 3;

FIG. 7 is a diagrammatic perspective view of the receiving tube according to the embodiment of FIG. 6;

FIG. 8 is a perspective view of an inner cylinder formed with several helically arranged slits;

FIG. 9 is a longitudinal cross-section view of the receiver assembly having external light guides;

FIG. 10 is a longitudinal cross-section view of the receiving assembly having internal light guides mounted on the receiving tube;

FIG. 11 is a longitudinal cross-section view of the receiving assembly where the receiver tube is replaced by a bundle of optical fibres;

FIG. 12 is a diagrammatic view of variations of coatings for the receiver tube, part A being opaque and helically twisted, and part B being a succession of opaque rings.

DESCRIPTION OF PREFERRED EMBODIMENTS

Figure 1:
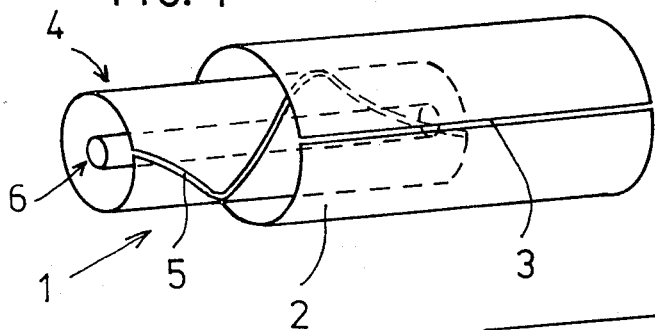
FIG. 1 is a perspective view of emitting member according to a first embodiment of the invention.

As is shown in the drawings, the invention is illustrated by two modifications where the function of emitter and receiver is inverted due to the principle of the inverse return of the light.

In the first and second embodiments, the emitter and the receiver are very close and proceed one from the other by substituting the emitter element and the receiver element.

Figure 2:
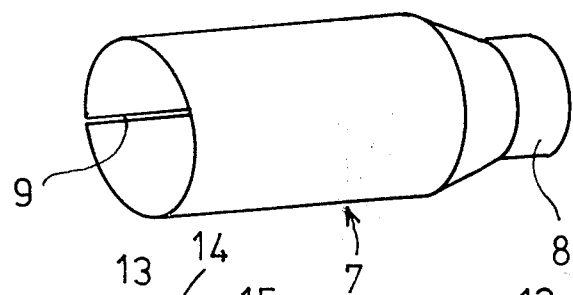
FIG. 2 is a perspective view of a receiving device according to a first embodiment of the invention.

The first embodiment shown in FIGS. 1 and 2 comprises an elongate light emitting assembly (FIG. 1) formed by a cylindrical envelope 2 having a straight slit 3 extending along a generatrix. This assembly also comprises an inner co-axial cylinder 4 stepwise rotated by a motor not shown, its revolutions and angular deviations being counted. This cylinder 4 has its natural surface formed with a helicoidally extending slit 5. The assembly has an inner co-axial light-emitting tube 6.

A light beam is thus obtained of cross-section close to that of a diamond, which moves along the slit 3.

The emitter-receiver assembly comprises a hollow elongate cylindrical receiver 7 (FIG. 2) which is closed at its ends by one or more photosensitive elements such as that indicated at 8 and is formed with a straight slit 9 in its lateral surface, the slit 9 being opposite to the slit 3 in the emitter cylinder. The inner faces are polished or covered with a fluorescent product.

This detecting device is connected to electronic circuits (not shown) and is used to measure the length of products, the latter being either stationary on an abutting support (not shown) or moving, by counting impulses during a shadow interval. For the measurements on an abutting support, a starting reference is necessary.

Variations of the emitter-receiver assembly in accordance with the invention are described below.

In both of them the moving member generating the light beam or ray is disposed outsize the receiver. The emitting function is separated from that which generates the light beam.

Figure 3:
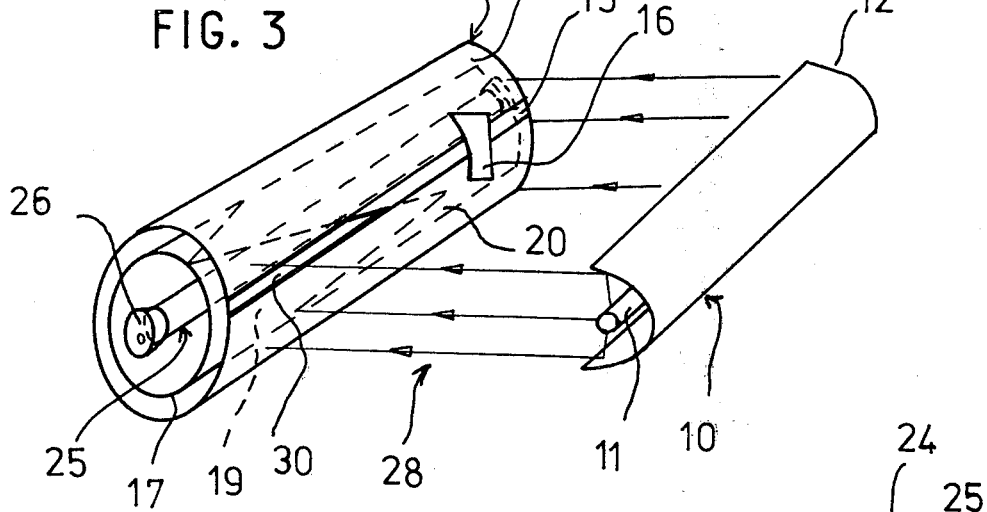
FIG. 3 is a perspective view of an emitter-receiver assembly according to a second embodiment of the invention.

The emitter proper is formed by a light ramp 10 comprising a tube 11 disposed on the focus line of a reflector 12 of parabolic profile so that a beam of parallel rays is formed (FIG. 3).

The receiver 13 comprises a fixed cylinder 14 open along a generatrix by a slit 15 which forms the input window. The lateral surface of this cylinder has, at the level of the slit 15 and at right angles therewith, parallel planes or light guides such as that indicated at 16 which direct the direct incident light and prevent parasitic oblique rays, which could adversely affect the measurements, from entering.

Figure 4:
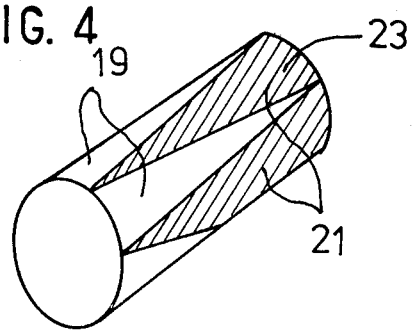
FIG. 4 is a perspective view of an inner rotating cylinder of the assembly illustrated in FIG. 3.
Figure 5:
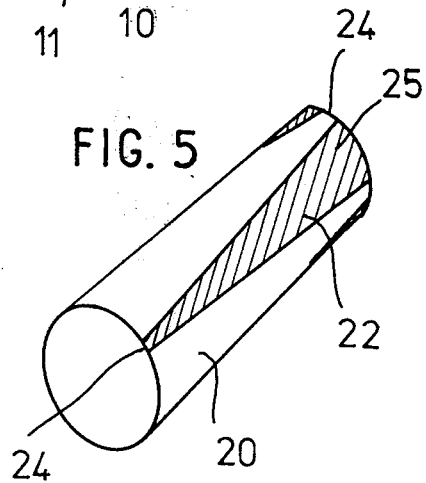
FIG. 5 is a perspective view of a lower rotating cylinder of the assembly of FIG. 3 according to a modification.

The receiver can have an inner co-axial cylinder 17 formed either with a helicoidal slit 18 (FIG. 6) or with triangular or trapezoidal slits such as 19 and 20 extending lengthwise throughout the cylinder (FIGS. 3, 4 and 5). These slits are alternated with solid zones 21 and 22, respectively, of the same triangular and trapezoidal shape and size. The base 23 of the triangles and the short basis 24 and the long basis 25 of the trapeziums are such that the number of slits and solid zones is even and whole. The helicoidal slits 5 and 8 have a pitch or a whole multiple of pitch along the length of the cylinder.

The moving inner cylinders 4 and 17 are rotated by a motor connected to an angular code not shown.

The cylinder 17 has inside it a co-axial light receiving and conducting rod 25a having at each of its ends a photosensitive element such that indicated at 26. This rod can have a rear ground portion so that a maximum of light is applied towards its ends to the photosensitive elements 26 as the sensitive surfaces of which are facing the ends.

The receiving rod 25a has, preferably on its rear part, a semicircular reflector (FIG. 7) of parabolic profile designed to concentrate the incident parallel rays 28 on the body of the tube.

The inter play of the slit 15 in the fixed cylinder 14 and of the slits 18 or 19 or 20 in the inner moving cylinder 17 produces either a luminous spot 29 (FIG. 5) or a longitudinally extended light beam 30 (FIG. 3), the spot or one end of the light beam being linearly displaced from one end to the other of the receiving rod 25a.

In order to decrease the speed of rotation of the cylinder 17, particularly when the speed of displacement of the products to be measured is high, a cylinder having several helicoidal slits 31 parallel to one another is used (FIG. 7).

It is possible to choose a cylinder of transparent or translucent material and cover the inner and/or outer faces of this cylinder with an opaque layer or a lining in which the necessary helix or helices are cut out.

In a modification (FIG. 10), the planes 16 are arranged inside the cylinder 17 in the form of small opaque discs mounted parallel to each other on the rod 25. In this event cylinder 14 has no outwardly projecting part.

According to another modification, the receiving rod 25a is replaced by a cylindrical bundle of optical fibres such that indicated at 34 formed by two half-bundles 35 and 36 of parallel fibres (FIG. 11).

Each fibre is connected to a rod arranged parallel to the axis of the cylinder, disposed facing the slit 15 and forming light pick-up points 37 arranged at regular intervals. The lightened fibres are counted.

The same effect of periodic picking-up at receiving spots or zones can also be obtained through other similar means, such as an opaque twisted element 38 (FIG. 12), part A, or rings disposed parallel to each other at regular intervals longer than the length of the spot.

Tests have shown that the receiving rod could be advantageously replaced by a inclined plane mirror provided that the outer planes 16 have an inclined reflecting part at their base; but that the embodiment according to FIGS. 3 and 4 is fully satisfactory and will often be preferred in practice.

What we claim is:

1. Apparatus for measuring the length of elongate products such as rolled steel shapes, comprising; an elongate light emitter for directing light onto an elongate product to produce a shadow up to an end of a length dimension of the product light receiver means for measuring said length dimension, comprising, a cylindrical stationary element and a cylindrical rotatable element, both extending along the light emitter, one inside the other, and both having apertures for forming, by an interplay of the apertures incident to a rotation of the rotatable element, a resulting aperture which has at least a portion thereof movable along the light emitter; and photo-electric transducer means comprising light-conducting rod means inside the elements of the light receiver means, for exposure of the rod to said shadow, through said resulting aperture, and photo-sensitive means at an end of the rod means.

2. Apparatus according to claim 1 in which the aperture of one of the cylindrical elements is a continuous longitudinal slot.

3. Apparatus according to claim 1 in which the element having said slot is stationary element.

4. Apparatus according to claim 3 in which the rotatable element is the one inside the other.

5. Apparatus according to claim 1 in which at least one aperture of one of the cylindrical elements is a slot which tapers longitudinally.

6. Apparatus according to claim 5 in which the slot is triangular.

7. Apparatus according to claim 5 in which the slot is trapezoidal.

8. Apparatus according to claim 1 in which at least one aperture of one of the cylindrical elements is helical.

9. Apparatus according to claim 8 in which said one cylindrical element has a plurality of helical slots extending along one another.

10. Apparatus according to claim 1 in which one of the cylindrical elements has light-guiding plates thereon for guiding incident light radially of the element.

* * * * *